Figure 1:
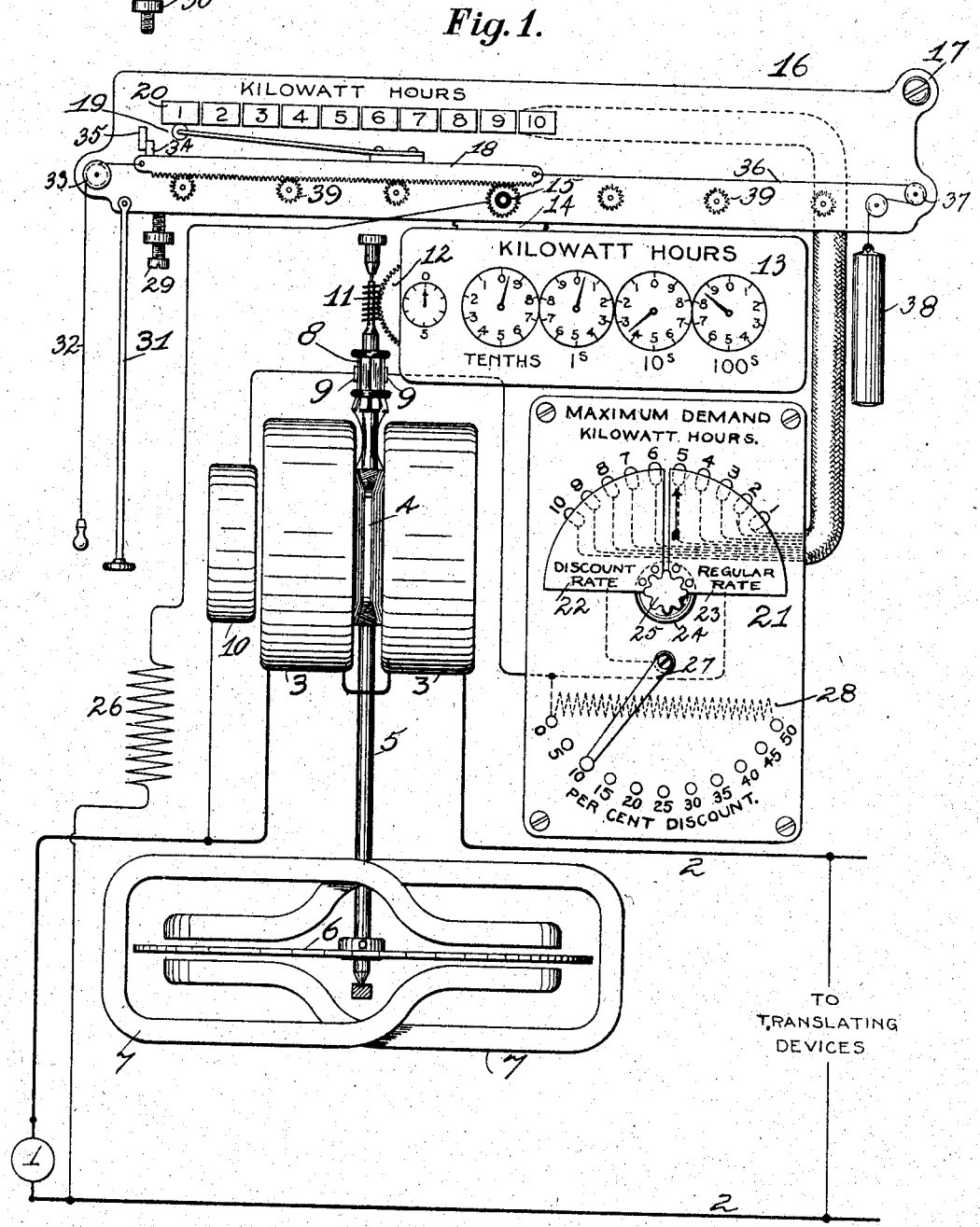

No. 796,045. PATENTED AUG. 1, 1905.
T. DUNCAN.
ELECTRIC METER.
APPLICATION FILED JULY 18, 1901. RENEWED JAN. 7, 1905.

2 SHEETS—SHEET 1.

WITNESSES:
INVENTOR.
Thomas Duncan
BY Charles A. Brown Duggy Diefield
ATTORNEYS.

No. 796,045. PATENTED AUG. 1, 1905.
T. DUNCAN.
ELECTRIC METER.
APPLICATION FILED JULY 18, 1901. RENEWED JAN. 7, 1905.

2 SHEETS—SHEET 2.

TO
TRANSLATING
DEVICES.

WITNESSES:
May N. Zabel.
Harvey L. Hanson.

INVENTOR.
Thomas Duncan
By Charles A. Brown Cragg & Belfield
ATTORNEYS.

UNITED STATES PATENT OFFICE.

THOMAS DUNCAN, OF CHICAGO, ILLINOIS.

ELECTRIC METER.

No. 796,045.  Specification of Letters Patent.  Patented Aug. 1, 1905.

Application filed July 18, 1901. Renewed January 7, 1905. Serial No. 239,971.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters, and has for its object the provision of a meter which may operate at one rate per unit of load or energy up to a given predetermined amount and at another rate per unit of load or energy for energy consumed in excess of the predetermined minimum quantity.

By means of my invention I am enabled to provide a meter which is adapted to operate at one rate of operation to measure load or energy that the consumer is to be charged for at a given rate, the meter in its further operation operating at a reduced rate to afford the consumer discount agreed upon. For this purpose there is provided in the preferred embodiment of the invention a means for effecting a reduction in the torque of the meter after it has registered the normal or predetermined minimum quantity of units, which may be in the form of kilowatt-hours, ampere-hours, or the like. To accomplish this readjustment of the torque, there is preferably provided a resistance which is excluded from circuit during the time the meter is operating to measure the minimum quantity of energy, which resistance is brought into circuit to reduce or otherwise modify the field of the said field-winding to change the torque per unit of load or energy. This resistance is brought into circuit by a switch whose contact parts are gradually brought together as the meter is measuring the minimum quantity of energy, these contact parts being engaged after the minimum quantity of energy has been measured, whereby the meter in its further operation operates at the predetermined reduced rate of speed per unit of load or energy that will cause the meter to register the load less the percentage of discount.

While I prefer to modify the torque of the meter in order to secure the required modified operation thereof, I do not wish to be limited to this precise mode of securing the general object of the invention.

The meter is one that is preferably provided with a rotating element that turns continuously in one direction and which is geared with a suitable train of wheels which operate indexes upon the reading-dial of the meter. This same counting-train is also employed for gradually bringing terminals of the conductor, including the torque-modifying resistance, into contact. There may be employed a small pinion driven by the wheel-train which meshes with a rack provided upon a moving trolley-bar which carries a trolley-roller adapted to engage contacts connected with similar contacts of a controlling-switch, the controlling-switch serving to bring a trolley-contact or a set of trolley-contacts into connection with the discount resistance, so that when the meter has been operated to bring the trolley-roller and the trolley-contact or set of trolley-contacts into engagement the meter will thereafter operate at the reduced rate of speed. These trolley-contacts may be marked to indicate various loads, while a switching device is provided having corresponding contact-buttons correspondingly marked electrically connected with these contacts, this switch serving to electrically connect all of the trolley-contacts indicating loads for which the consumer is to receive discount, the trolley-contacts being preferably arranged in regular order, the trolley moving from the trolley-contacts of lower value toward the contacts of higher value. The said switching device connects the selected trolley contact or contacts in circuit with the discount resistance, the trolley-roller then serving to include this discount resistance in circuit with a winding of the meter, preferably the pressure-winding, when the meter has been operated to the required extent. The adjusting resistance is preferably a step-by-step resistance provided with buttons connected with the various sections of the resistance, a switch-arm connected with the meter-winding by engagement with a rheostat-button serving to include a quantity of resistance corresponding to the agreed discount in circuit with the meter. By means of the invention a great deal of bookkeeping is dispensed with, while the consumer may know to a certainty exactly what he is to be charged.

I will explain my invention more fully by reference to the accompanying drawings, in which—

Figure 2:
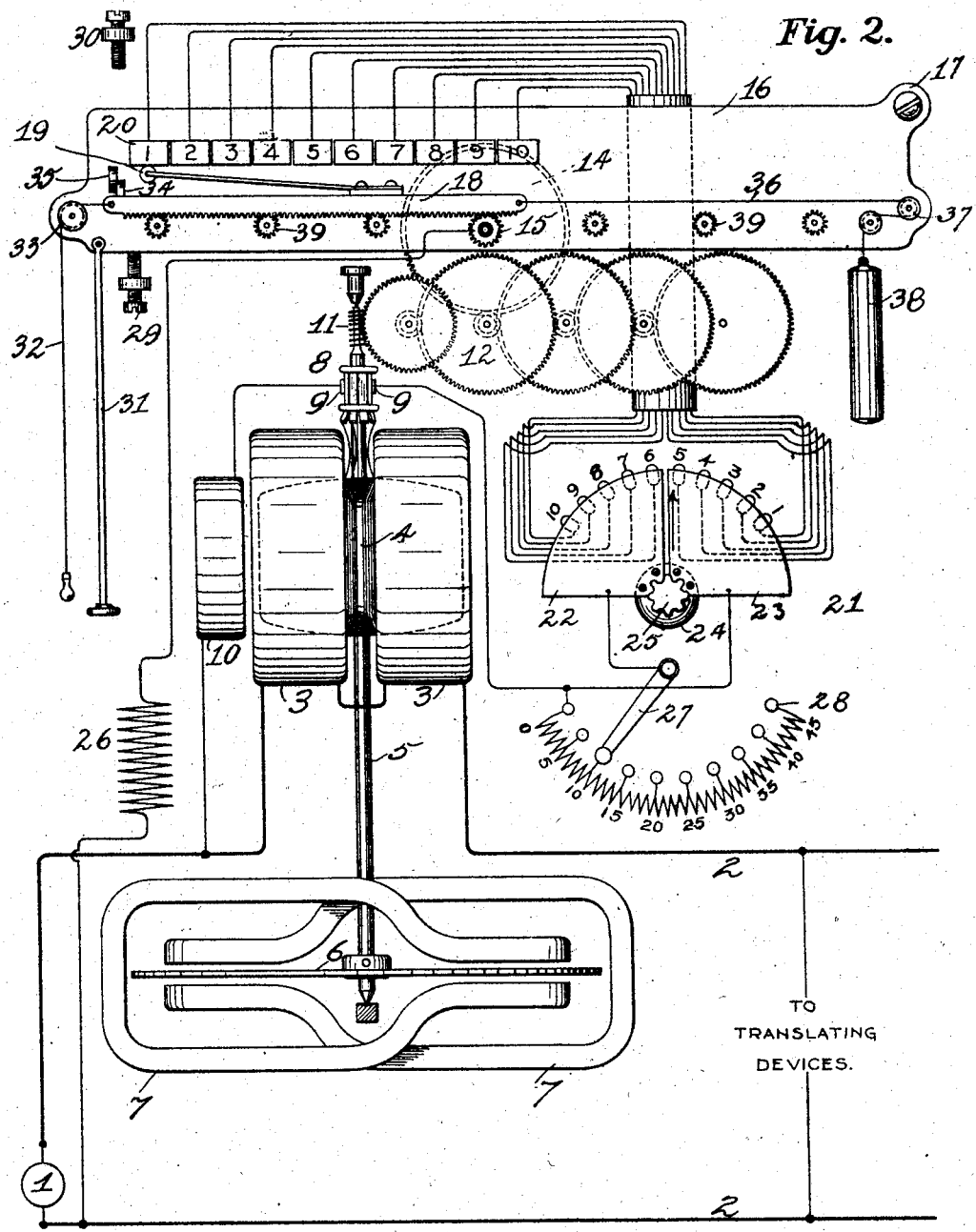

Figure 1 illustrates a system of electrical distribution with the meter of my invention associated therewith. Fig. 2 is a view similar to Fig. 1, but more diagrammatic, the reading-dial and face-plate of the resistance-box being removed.

Like parts are indicated by similar characters of reference in both views.

I have illustrated in both figures a source of current 1, either direct or alternating, conveying current over mains 2 2 to translating devices. A current field-winding, subdivided into coils 3 3, is included in one of the mains and produces a field proportional to the current. A pressure-winding, in this instance in the form of a commutated armature 4, is mounted upon a spindle 5, at the lower end of which is provided a damping-disk 6, arranged within the fields of permanent magnets 7 7. The spindle 5 supports the commutator 8, which is in engagement with commutator-brushes 9 9, which include the armature 4 in bridge of the transmission-mains, whereby a field is produced proportional to the pressure. A starting-coil 10 is also included in the bridge-circuit for the purpose of overcoming friction and to enable the meter to start on light loads. There is thus organized the motor element of a wattmeter; but I do not wish to be limited to the precise form of meter illustrated for measuring loads. The upper end of the spindle is provided with a worm 11, which engages the wheels of a counting-train 12, that actuate the indexes upon the reading-dial 13. This wheel-train includes a wheel 14, that is preferably distinct from the counting portion of the train as far as the operation of the indexes is concerned, but is actuated at a suitable rate to include the prediscount resistance in circuit or otherwise modify the rate of operation of the meter at the proper time. This wheel 14 is provided with a pinion 15, coaxially arranged with respect thereto, this pinion 15 being insulated from the wheel 14 and the swinging frame 16, hinged at 17. The pinion 15 engages a horizontally-movable trolley rack-bar 18, upon which is mounted a trolley-roller 19, having electrical connection therewith. A series of trolley-contacts 20, marked with numerals corresponding to different quantities of energy, are arranged in line, the trolley-roller having successive engagement with these trolley-contacts. As indicated, the meter in its operation is adapted to effect a movement of the trolley rack-bar 18 toward the right, the meter in completing the registration of the first kilowatt-hour moving the trolley-roller from contact with the first kilowatt trolley-contact to the second. After the meter has registered the second kilowatt-hour the trolley-roller 19 is brought into contact with the third kilowatt trolley-contact, and so on throughout the series, the particular meter illustrated being capable of measuring as high as ten kilowatt-hours. A switching mechanism 21 is illustrated, being provided with contact-buttons marked with the various amounts of load corresponding to the trolley kilowatt-contacts, the buttons of the switch marked similarly to the trolley-contacts being electrically connected. The switch is provided with two contact-blades 22 23, insulated from each other and mounted upon a common revoluble support 24, to which an operating-handle 25 is secured. The switch-blades are in the form of quadrants, the peripheral length of each of which corresponds to the peripheral space occupied by the switch-buttons. The switch-blade 23 may be provided with an arrow, as indicated, by which the switch may be set, this arrow registering with the switch-button corresponding to that quantity of energy beyond which discount is to be allowed. The switch-blade 23 is directly connected with one of the commutator-brushes, whereby the trolley-contacts in electrical connection with the switch-buttons that are engaged with the blade 23 are directly connected with the said commutator-brush. Thus the pinion 15, through the medium of of the trolley rack-bar 18, the trolley-wheel 19, and any of the trolley-contacts corresponding to the buttons in engagement with the blade 23, is connected with the said commutator-brush, the armature-circuit being completed through a resistance 26, connected with the pinion 15.

Supposing, for example, that no discount is to be allowed for the first five kilowatt-hours, during the time that the meter is registering this minimum amount of current the armature is subject to a normal pressure producing a normal rate of meter operation. When the trolley-roller has been removed from engagement with the trolley-contact marking five kilowatt-hours into engagement with the trolley-contact marking six kilowatt-hours, circuit through the armature is no longer closed through the blade 23, but is closed through the blade 22, which is connected with a rheostat-arm 27, adapted for engagement with any of the terminals of the rheostat 28. These terminals or buttons are connected with portions of the resistance 28, which when included in circuit with the armature causes a modified or reduced torque per unit of load or energy. The switch-arm 27 is shown in engagement with a rheostat-button marked to indicate ten per cent. discount, the remaining buttons being marked to indicate other discounts. The kilowatt trolley-contacts in excess of the trolley-contact indicating five kilowatt-hours are all included in circuit with the armature through the contact-blade 22, the rheostat-arm 27, and two sections of the resistance 28, so that while the trolley-roller is in engagement with any of the said trolley-contacts the meter will operate with a torque reduced ten per cent. to cause a reduction in the rate of operation of the meter per unit of load or energy of ten per cent. If discount is to be allowed above four kilowatt-hours, the blades 22 and 23 are moved one space toward the right. If no discount is to be allowed, the switch-arm 27 may be placed upon the first button of the resistance 28 or the blade 23 may be brought into connection with all of the kilowatt or switch contacts. If a discount is to be allowed for the entire load, the switch-arm 27 is first set to the selected discount-button of the resistance 28, whereafter the blade 22 is brought into engagement with all of the contacts of the switch 21.

The swinging frame 16 normally rests upon a lower stop 29 to mesh the wheel 14 with the remainder of the wheel-train. At the end of the month or other stated period when the reading of the meter is taken the frame is elevated to permit the resetting of the trolley rack-bar 18 without effecting the restoration of the counting portion of the wheel-train, as it is desired to integrate the totalized measurements during a number of periods. An upper stop 30 is provided for the purpose of limiting the upward movement of the frame, while a rod 31, projecting through the casing of the instrument, may be employed for moving the frame. The trolley rack-bar may be provided with a cord 32 at its left end passing over a pulley 33, by which the rack-bar may be restored to its initial position after each reading, a lug 34, carried by the rack-bar, by engagement with the lug 35 upon the swinging frame 16 serving to limit the movement of the rack-bar. This rack-bar may also have connected with its right-hand end a cord 36, passing over the pulleys 37, to which cord may be secured a counterweight 38 or its equivalent for the purpose of assisting the counting-train in the operation of the rack-bar, the counterweight serving to overcome friction between the pinion 15 and the rack-bar 18 and also serving preferably to compensate for friction in the rest of the wheel-train. Supplemental pinions 39 may be provided for guiding the rack-bar in its horizontal movement.

I have thus shown circuits and controlling apparatus associated therewith for accomplishing the object of my invention; but I do not wish to be limited thereto.

It is obvious that many changes may be made from the specific embodiment of my invention herein shown and particularly described, and I do not, therefore, wish to be limited to the precise embodiment thereof herein set forth; but,

Having thus described my invention, I claim as new and desire to secure by Letters Patent—

1. The combination with a meter, of means governed thereby for changing the rate of operation of the meter per unit of load or energy when the meter has measured a predetermined quantity of energy, substantially as described.

2. The combination with a meter, of means for changing the rate of operation of the meter per unit of load or energy, and means operated by the meter to effect the application of the aforesaid means when the meter has measured a predetermined quantity of energy, substantially as described.

3. The combination with a meter, of means for changing the rate of operation thereof per unit of load or energy, a circuit including the means, and a switch operated by the meter after the meter has operated to measure a predetermined quantity of energy to change the circuit relation of the said means to thereafter cause the meter to operate at another rate of speed per unit of load or energy, substantially as described.

4. The combination with a meter, of means governed thereby for reducing the rate of operation of the meter per unit of load or energy, when the meter has measured a predetermined quantity of energy, substantially as described.

5. The combination with a meter, of means for reducing the rate of operation of the meter per unit of load or energy, and means operated by the meter to effect the application of the aforesaid means when the meter has measured a predetermined quantity of energy, substantially as described.

6. The combination with a meter, of means for reducing the rate of operation thereof per unit of load or energy, a circuit including the means, and a switch operated by the meter after the meter has operated to measure a predetermined quantity of energy to change the circuit relation of the said means to thereafter cause the meter to operate at another rate of speed per unit of load or energy, substantially as described.

7. The combination with a meter, of means for changing the rate of operation of the meter per unit of load or energy, and a wheel-train operated by the meter to effect the application of the said means when the meter has measured a predetermined quantity of energy, substantially as described.

8. The combination with a meter, of means for reducing the rate of operation of the meter per unit of load or energy, and a wheel-train operated by the meter to effect the application of the said means when the meter has measured a predetermined quantity of energy, substantially as described.

9. The combination with a meter, of means for changing the torque of the meter per unit of load or energy, and means operated by the meter after it has measured a predetermined quantity of energy for effecting the application of the said torque-changing means, whereafter the meter may operate at a different rate per unit of load or energy, substantially as described.

10. The combination with a meter, of means for reducing the torque of the meter per unit of load or energy, and means operated by the meter after it has measured a predetermined quantity of energy for effecting the application of the said torque-reducing means, whereafter the meter may operate at a reduced rate of speed per unit of load or energy, substantially as described.

11. The combination with a meter, of a resistance for inclusion in circuit with a meter-winding to reduce the torque of the meter, and mechanism operated by the meter for including the said resistance in circuit with said meter-winding after the meter has measured a predetermined quantity of energy, whereafter the meter may operate at a reduced rate of speed per unit of load or energy, substantially as described.

12. The combination with a meter, of a resistance for inclusion in circuit with a meter-winding to reduce the torque of the meter, and a switching device operated by the meter for including the said resistance in circuit with said meter-winding after the meter has measured a predetermined quantity of energy, whereafter the meter may operate at a reduced rate of speed per unit of load or energy, substantially as described.

13. The combination with a meter, of a resistance for inclusion in circuit with a meter-winding to reduce the torque of the meter, a switching device, and a wheel-train actuated by the meter and operating the switching device after the meter has measured a predetermined quantity of energy to include the said resistance in circuit with said field-winding, whereafter the meter may operate at a reduced rate of speed per unit of load or energy, substantially as described.

14. The combination with a meter, of a resistance for inclusion in circuit with a meter-winding to reduce the torque of the meter, a switching device, a wheel-train actuated by the meter and operating the switching device after the meter has measured a predetermined quantity of energy to include the said resistance in circuit with said field-winding, whereafter the meter may operate at a reduced rate of speed per unit of load or energy, counting-indexes operated by a portion of the said wheel-train, the balance of the wheel-train serving directly to operate the said switching device, and means whereby the switch-operating portion of the wheel-train may be separated from the balance of the wheel-train to reset the switching device without restoring the counting-indexes to their initial position, substantially as described.

15. The combination with a meter, of a resistance for inclusion in circuit with a meter-winding to reduce the torque of the meter, a switching device, a wheel-train actuated by the meter and operating the switching device after the meter has measured a predetermined quantity of energy to include the said resistance in circuit with said field-winding, whereafter the meter may operate at a reduced rate of speed per unit of load or energy, counting-indexes operated by a portion of the said wheel-train, the balance of the wheel-train serving directly to operate the said switching device, a rack-bar engaging the latter portion of the counting-train and carrying a trolley constituting a part of the switching device, the rack-bar being moved by the wheel-train into connection with the said resistance to include the same in circuit with said meter-winding, and a swinging frame supporting the switching device, rack-bar and the said balance of the wheel-train, whereby the counting portion of the wheel-train may be removed from the switch-actuating portion to permit a resetting of the rack-bar without effecting a restoration of the counting-indexes, substantially as described.

16. The combination with a meter, of a resistance for inclusion in circuit with a meter-winding to reduce the torque of the meter, a switching device, a wheel-train actuated by the meter and operating the switching device after the meter has measured a predetermined quantity of energy to include the said resistance in circuit with said field-winding, whereafter the meter may operate at a reduced rate of speed per unit of load or energy, counting-indexes operated by a portion of the said wheel-train, the balance of the wheel-train serving directly to operate the said switching device, a rack-bar engaging the latter portion of the counting-train and carrying a trolley constituting a part of the switching device, the rack-bar being moved by the wheel-train into connection with the said resistance to include the same in circuit with said meter-winding, a swinging frame supporting the switching device, rack-bar and the said balance of the wheel-train, whereby the counting portion of the wheel-train may be removed from the switch-actuating portion to permit a resetting of the rack-bar without effecting a restoration of the counting-indexes, a handle 31 connected with the said frame to effect its actuation, a cord 32 connected with one end of the rack-bar to effect its restoration, and a weight 36 connected with the other end of the rack-bar to facilitate its operation, substantially as described.

17. The combination with a meter, of a switch part 19 moved by the meter, a plurality of switching contacts 20 corresponding to various quantities of energy, a switching device 21 provided with contacts also corresponding to different quantities of energy and connected with the aforesaid contacts, electrically separate switching-blades 22 and 23 forming a part of the switch 21, each adapted to be thrown into engagement with one or more of the contacts of the switch 21 or thrown out of engagement therewith, a discount resistance 28, a switch-arm 27 connected with the blade 22 and serving to include the said discount resistance in circuit with a meter-winding, a switch-blade 23 being directly connected with the said meter-winding without passing through the discount resistance, the part 19, when brought into electrical connection with the parts connected with the switch-blade 22, serving to include the discount resistance in circuit with the meter-winding, whereby the meter may be set to produce one rate of operation per unit of load or energy while measuring a predetermined quantity of energy and operated at a reduced rate of speed per unit of load or energy when measuring an additional quantity of energy, substantially as described.

18. The combination with a meter, of a switch part 19 moved by the meter, a plurality of switching contacts 20 corresponding to various quantities of energy, a switching device 21 provided with contacts also corresponding to different quantities of energy and connected with the aforesaid contacts, electrically separate switching-blades 22 and 23 forming a part of the switch 21, each adapted to be thrown into engagement with one or more of the contacts of the switch 21 or thrown out of engagement therewith, a discount resistance 28, a switch-arm 27 connected with the blade 22 and serving to include the said discount resistance in circuit with a meter-winding, a switch-blade 23 being directly connected with the said meter-winding without passing through the discount resistance, the part 19, when brought into electrical connection with the parts connected with the switch-blade 22, serving to include the discount resistance in circuit with the meter-winding, whereby the meter may be set to produce one rate of operation per unit of load or energy while measuring a predetermined quantity of energy and operated at a reduced rate of speed per unit of load or energy when measuring an additional quantity of energy, the resistance 28 being adjustable, whereby the meter may be adjusted for differing rates of discount, substantially as described.

19. The combination with a meter, of speed-reducing apparatus, and switching mechanism operated by the meter for effecting a coöperative relation between the said apparatus and the meter to reduce the rate of operation of the meter per unit of load or energy, whereby the meter may operate at one rate for measuring a minimum quantity of energy and at a reduced rate in measuring additional energy, substantially as described.

20. The combination with a meter, of means for changing the rate of operation of the meter per unit of load or energy when the meter has measured a predetermined quantity of energy, substantially as described.

21. The combination with a meter, of means operated by the meter to effect a change in the operation of the meter per unit of load or energy when the meter has measured a predetermined quantity of energy, substantially as described.

22. The combination with a meter, of means for reducing the rate of operation of the meter per unit of load or energy, when the meter has measured a predetermined quantity of energy, substantially as described.

23. The combination with a meter, of means governed thereby for reducing the rate of operation of the meter per unit of load or energy, and means operated by the meter to effect the application of the aforesaid means when the meter has measured a predetermined quantity of energy, substantially as described.

24. The combination with a meter, of speed-reducing apparatus, and switching mechanism operated by the meter for effecting a coöperative relation between the said apparatus and the meter to reduce the rate of operation of the meter per unit of load or energy, substantially as described.

In witness whereof I hereunto subscribe my name this 3d day of June, A. D. 1901.

THOMAS DUNCAN.

Witnesses:
GEORGE L. CRAGG,
HARVEY L. HANSON.